INVENTORS
John H. Diehl
Warren Dean Weikart
Richard F. Nenstiel

BY

ATTORNEYS

April 14, 1964    J. H. DIEHL ETAL    3,128,661
BAND SAWS
Filed May 6, 1960    4 Sheets-Sheet 2

INVENTORS
John H. Diehl
Warren Dean Weikart
Richard F. Nenstiel

ATTORNEYS

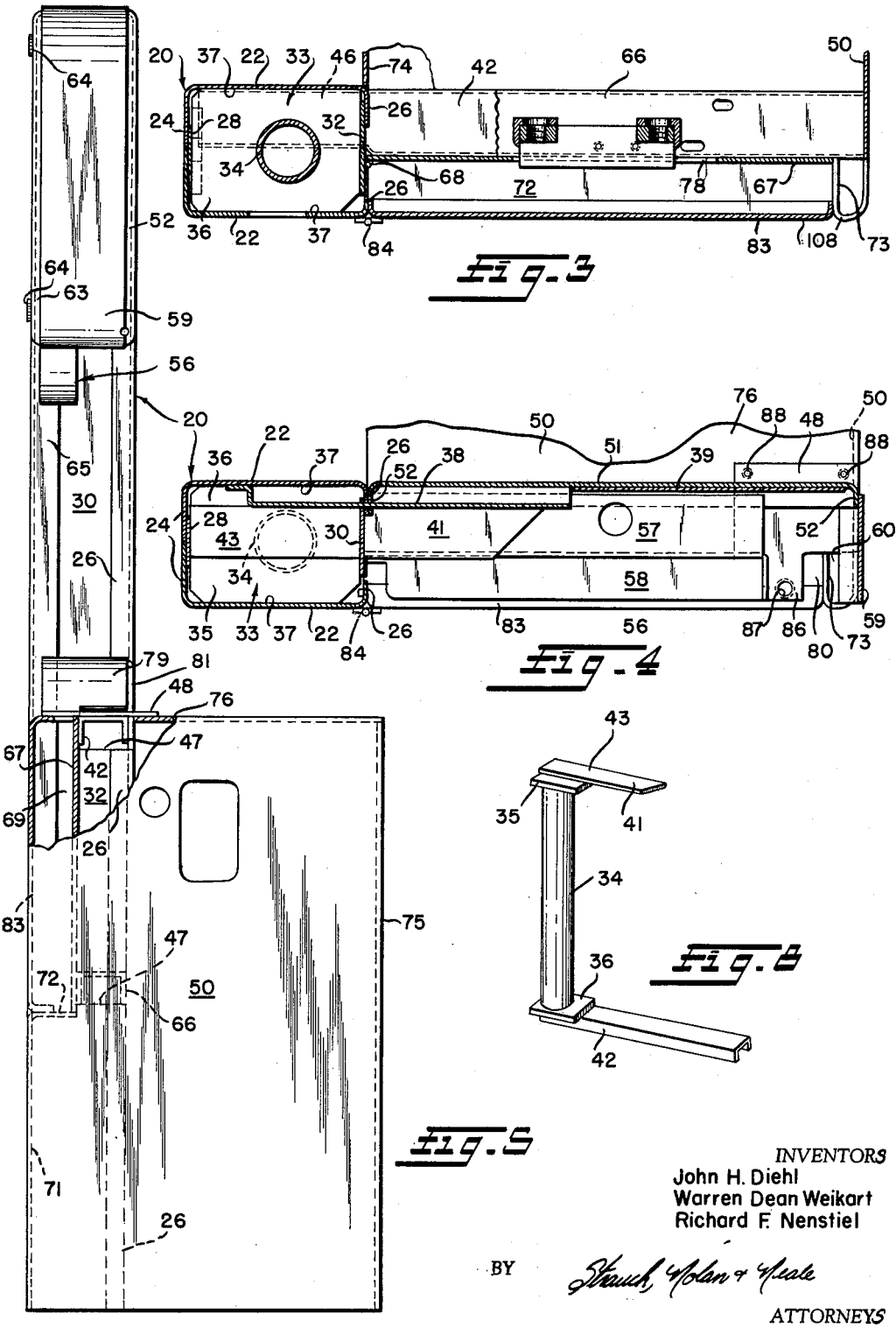

April 14, 1964   J. H. DIEHL ETAL   3,128,661
BAND SAWS

Filed May 6, 1960   4 Sheets-Sheet 4

INVENTORS
John H. Diehl
Warren Dean Weikart
Richard F. Nenstiel

BY *Strauch, Nolan & Neale*

ATTORNEYS

United States Patent Office 3,128,661
Patented Apr. 14, 1964

3,128,661
BAND SAWS
John H. Diehl, Warren Dean Weikart, and Richard F. Nenstiel, Bellefontaine, Ohio, assignors to Rockwell Manufacturing Company, Pittsburgh, Pa., a corporation of Pennsylvania
Filed May 6, 1960, Ser. No. 27,361
8 Claims. (Cl. 83—201)

This invention relates to band saws and has for its general object and purpose to provide a light weight but rugged machine of this kind of novel design and construction.

In the sawing and filing of metal with bandsaws and band type filling machines the force required to feed the metal work piece to the saw or files is of such a magnitude as to cause large stresses in the wheel support structure and in other parts of the frame. Thus in a metal cutting bandsaw or filing machine it is necessary to provide supporting structure of extreme rigidity. Heretofore it has been the practice to provide frame structures made up of metal castings of the requisite strength. Since castings are heavy, expensive and generally require machining operations in order to be assembled with other parts of the machine the result was a heavy, cumbersome and expensive frame structure.

Accordingly it is one of the objects of this invention to provide a band saw or similar frame structure which can be fabricated from steel stampings welded together in such a fashion as to provide a relatively inexpensive, light weight structure having sufficient strength and rigidity in the throat area to withstand the stresses induced therein by the thrust of the blade against the work and the weight and feed thrust applied to the work.

Another object of the invention resides in the provision of a novel welded sheet steel bandsaw or like frame structure having a hollow vertical column, upper and lower compartment assemblies for the operating parts of the machine rigidly welded to said column and extending laterally from one side thereof, and a throat reinforcing structure to impart sufficient rigidity to the compartment assemblies to better withstand the working stresses encountered in metal cutting usage.

A further object of the invention resides in the provision of a reinforcing unit internally welded to the upper compartment assembly of the bandsaw or like machine tool cabinet structure and extending through the hollow vertical column and welded to the work table supporting member.

A still further object resides in providing a novel welded steel frame structure having upper and lower compartment assemblies rigidly welded to a hollow vertical column formed of welded steel with a rigid column reinforcing member rigidly connected at one end to the upper compartment support structure and at the other end to the lower compartment support structure to provide an integral frame strucure of extreme rigidity.

With the above and other objects in view, the invention comprises the improved band saw frame, and the construction and relative arrangement of the several parts, as will hereinafter be more fully described, illustrated in the accompanying drawings and subsequently incorporated in the subjoined claims.

In the drawings wherein we have disclosed one simple and practical embodiment of the present invention, and which similar reference characters designate corresponding parts throughout the several views:

FIGURE 3 is a horizontal section taken on the line 3—3 of FIGURE 2.

FIGURE 4 is a horizontal section taken on the line 4—4 of FIGURE 2.

FIGURE 5 is a side elevation taken from the right side of the structure.

FIGURE 8 is a perspective view of the reinforcing and support unit or assembly provided by this invention.

Figure 1:
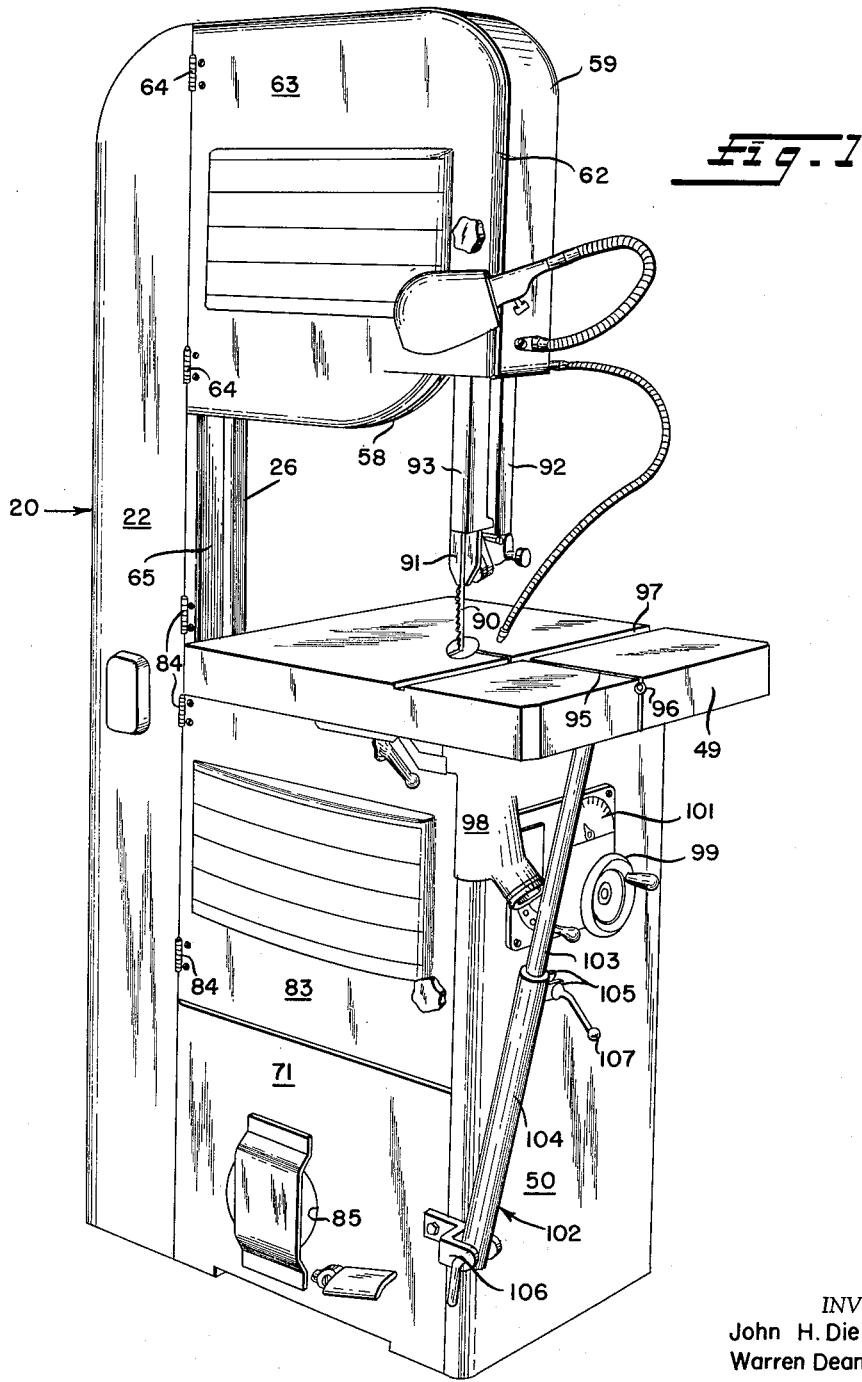
FIGURE 1 is a perspective view illustrating a band saw embodying the present invention.

Referring to FIGURES 1 through 6 of the drawings, the improved welded machine frame or cabinet structure includes a vertical column 20 at the left hand side of the operator's position. Preferably, this column comprises an exterior hollow casing made up of two sheet metal sections 22 of channel shaped form in cross section having relatively wide outer side flanges 24 and narrow, vertically extending, side wall opening defining inner side flanges 26. The vertical edges of the flanges 24 are abuttingly contacted throughout their length and firmly secured in abutting relation by a vertically extending splice plate 28 bridging the butting edges and overlapping the inner faces of flanges 24 to which they are securely welded. The flanges 26 lying in edge opposed laterally spaced relation are similarly connected in spaced apart relation by relatively wide upper and lower splice plates 30 and 32 respectively securely welded in spanning overlapping relation to the inner faces of flanges 26. These splice plates thus effectively join sheet metal channel sections 22 together to form a hollow, four sided support column of generally rectangular configuration in cross section providing substantial axial support strength and lateral flexibility. Such a column while wholly adequate to support the weight of upper and lower wheel compartments employed in bandsaws and band type filing machines in somewhat flexible and, therefore, lacks the rigidity and firm supporting characteristics of the heavy conventional cast frames. It follows, therefore, that the heavy cutting and feed forces incident to metal cutting and filing operations have a tendency to impart twisting and bending forces to the sheet metal column with the result that the cantilever supported wheel compartments and wheels, due to lateral lever arm effect, permit the downwardly moving cutting run of the saw to swing undesirably prejudicially affecting the cutting and filing accuracy of the tool.

To overcome this objection, the present invention contemplates welding a column reinforcing and support unit or assembly of heavy tube or plate steel 33 of a length sufficient to span the vertical throat area between the upper compartment assembly and the lower compartment assembly interiorly of the hollow rectangular column. Reinforcing and support unit or assembly 33, as will be clear from a consideration of FIGURES 2 through 6, comprises a column reinforcing tube and support arms to be hereinafter described. The reinforcing tube is made up of a length of heavy steel tubing 34 of cylindrical configuration in cross-section each end of which is welded in end butting relation to rectangular mounting plates 35 and 36. Plate 35 is dimensioned to snugly abuttingly engage and be welded in edge welded relation to the inner faces of splice plates 28 and 30, the inner face 37 of the front wall of column 20 and the face of reinforcing rib 38 of upper compartment reinforcement plate 39 as best seen in FIGURE 4. Plate 36, as will best appear from FIGURE 3, is dimensioned to be edge welded to the inner faces of splice plates 28 and 32 and the inner face 37 of both the front and back walls of column 20. By reason of this vertically spaced connection of tube 34 and column 20, column 20 throughout its length opposite the throat area of the machine is made perfectly rigid.

Figure 2:
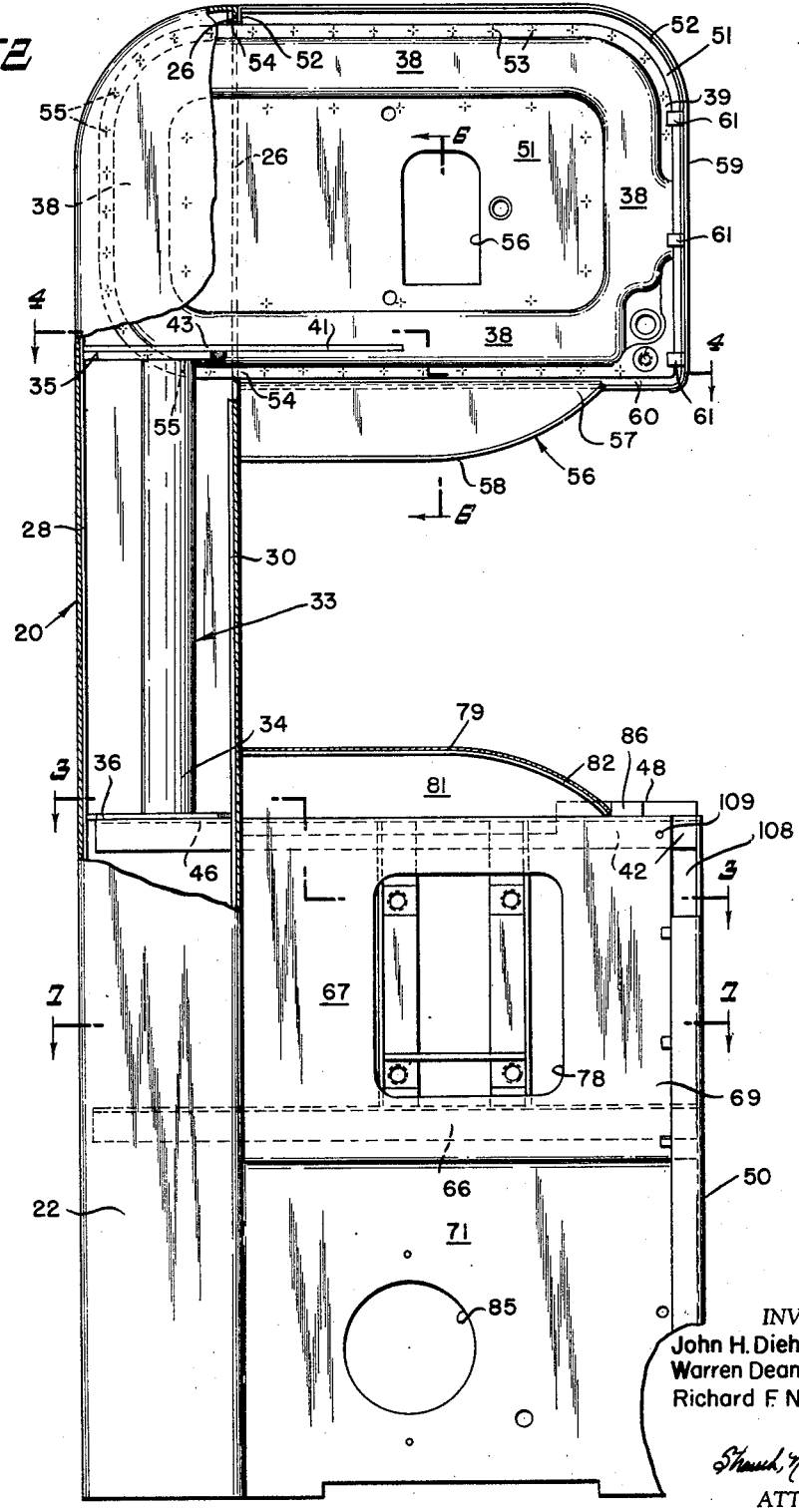
FIGURE 2 is a front elevational view of the structure, with the doors of the upper and lower wheel housing removed, the column front wall broken away and the trunnion assembly omitted from its support plate.

The support arms of assembly 33, comprise a laterally extending thick plate 41 and a channel bar 42 for respectively supporting the upper compartment assembly and the lower compartment assembly in a manner to concentrate the major static and dynamic stresses of these compartments on the short length tube 34. This is accomplished by a cantilever connection of the inner ends of each arm to the attachment plates 35 and 36, preferably by welding. As best seen from FIGURES 4 and 6, plate 41 has its inner end 43 face butted against and welded to the upper face of mounting plate 35 and extends outwardly through a horizontal slot 44 (FIGURE 6) provided in splice plate 30 and leading into the notch in rear flange 26 and the rear edge of splice plate 30 provided to pass the lower run of reinforcing rib 38 of plate 39. Channel bar 42 is similarly cantilever and face butt connected at its inner end 46 (FIGURES 2 and 3) to the lower face of mounting plate 36 and extends outwardly through an opening 47 (FIGURE 5) formed by opposing notches in rear flange 26 and upper rear corner of splice plate 32. As best seen in FIGURE 2, the outer end of arm 42 extends to the lower compartment side wall 50 opposite column 20 and has a horizontally disposed mounting plate 48 welded to its upper face. Plate 48 forms the mounting for the work table support bracket (not shown) provided for tiltingly supporting work table 49. Since the table bracket and table forms no part of the present invention and is fully shown in Wiken et al. United States Letters Patent 2,604,126 dated July 22, 1952, reference may be had to the issued patent for a more detailed disclosure thereof.

Figure 6:
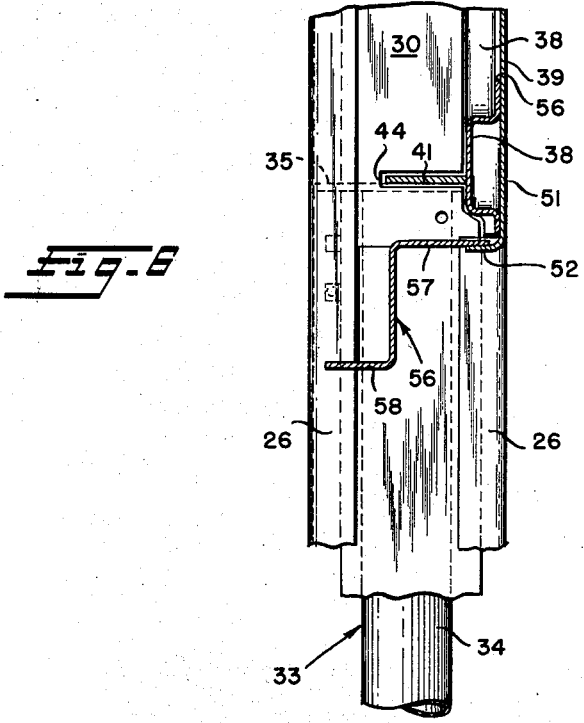
FIGURE 6 is a vertical sectional view taken on the line 6—6 of FIGURE 2.

As best seen in FIGURES 2, 4 and 6, the upper wheel compartment assembly extends laterally from the upper end of the column 20 and comprises a rear sheet metal body wall 51 having an angularly disposed forwardly projecting flange 52 extending along each edge. The wall 51 is reinforced and rigidly connected to the column 20 and the reinforcing assembly by means of reinforcement plate 39 securely welded at a plurality of points 53 to the inner face of the wall 51. Plate 39 covers the major portion of the surface of wall 51 and is die pressed to form the annularly continuous reinforcing rib 38 of a suitable width adjacent to and parallel with the outer edge of plate 39. It will be noted that the reinforcing plate 39 is of greater length than wall 51 and projects beyond the inner column end thereof. The column flange 26 and wall flange 52 at this end of wall 51 are cut away or recessed vertically as at 54 to accommodate the protruding end of the plate 39 and its rib 38. The flanges 52 and 26 are securely welded together while the adjacent end portion of the plate 38 extends into the column 20 and in contact with the surface of the rear wall of said column to which said end of the reinforcing plate is securely welded at a plurality of spaced points, as indicated at 55. The compartment wall 51 and reinforcing plate 39 are provided with vertically elongated openings indicated at 56 (FIGURES 2 and 6) to accommodate parts of the upper wheel mounting which mountings form no part of the instant invention and are, therefore, not shown or described herein.

A wheel guard member 56, also stamped from sheet metal, of general Z-shaped form in cross section, has its upper horizontal portion 57 (FIGURE 6) welded inside of the lower flange 52 on the wall 51 and provides a lower horizontal portion or door abutment flange 58 (FIGURES 2 and 6). This guard member terminates in spaced relation from the right hand vertical edge of the compartment assembly (FIGURE 2) and at this end the lower flange portion 58 is upwardly curved in more or less concentric relation with the wheel mounted within the upper compartment.

To the flange 52 at the top and right hand end of the wall 51 (FIGURE 2), externally thereof one edge of a metal door guard strip 59 is securely welded and projects forwardly thereof and downwardly around the lower right end of the compartment as will be clear from an inspection of FIGURE 2 to provide a blade guide passage 60 between its terminus and the upwardly curved end of guard member 56. Suitable stop lugs 61 are welded to the inner face of the vertical end portion of strip 59 to be abutted by a marginal flange 62 on the compartment door 63 (FIGURE 1) which flange passes inside of strip 59 when the door is closed. Door 63 is hingedly mounted upon the vertical column 20 by suitably spaced hinges 64. A vertical guard member 65 of substantially U-shaped form in cross section is welded to the inner face of the door at its lower hinged edge and extends downwardly therefrom, providing a channel through which the saw blade moves upwardly to the upper drive wheel. This guard member at its lower end is also hinged to the column 20, as indicated at 84.

Figure 7:
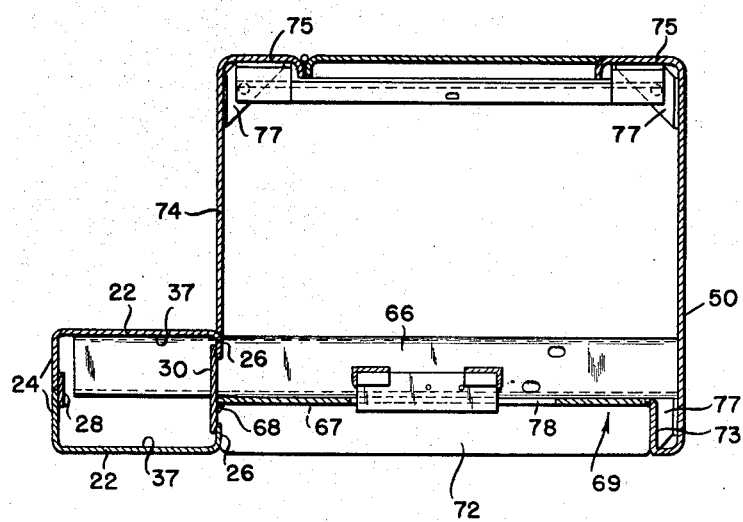
FIGURE 7 is a horizontal sectional view taken along the line 7—7 in FIGURE 2.

The lower wheel and motor compartment assembly extends rearwardly as well as laterally from the vertical column 20. This assembly in addition to channel arm 42 includes a vertically downwardly spaced channel member 66 (FIGURES 2 and 7) of inverted U-shaped form in cross section. Members 42 and 66 at one of their ends extend through suitable recesses 47 provided in the flange 26 and splice plate 30 of column 20 and one side flange of each of said members is securely welded to the rear wall of the column section 22. The other side flanges of members 42 and 66, have a vertically disposed wall 67 suitably welded thereto. Wall 67 extends below the member 66. Referring to FIGURE 7, the vertical side edge of wall 67 is welded to plate 30, as indicated at 68, thus effectively closing the compartment space to the rear of wall 67 and forming a lower wheel compartment 69 at the front of wall 67.

A second vertical wall section 71 is disposed substantially flush with the front side of column 20 and its upper end has a horizontal flange or shelf portion 72 extending inwardly to the lower edge of the wall section 67, as shown in FIGURES 2, 5 and 7. At each of its vertical side edges, wall section 71 is suitably flanged and securely welded to the adjacent flange 26 of the column 20 and to the inwardly turned front vertical edge portion 73 of the right hand side wall 50 of the lower compartment assembly. This wall, and the opposite side wall 74, may be integrally formed with a rear end wall 75 (FIGURE 7) to the upper edges of which a top wall 76 is suitably welded. The front vertical edge of wall 74 is also welded to the rear section of column 20. The compartment walls 71, 50, 74, and 75 at their lower ends are welded to corner foundation plates 77 (FIGURE 7) of suitable form, which if desired may be anchored to the floor. The vertical wall section 67 is provided with a large opening 78 to accommodate parts of the mounting for the lower wheel which rotates in a vertical plane in compartment 67. A wheel guard member 79 (FIGURES 2 and 5) is welded along its longitudinal rear edge to a flange on the upper edge of a vertical rear wall 81, the lower edge of which is suitably welded to channel member 42. This guard member extends forwardly over the upper edge of wall section 67 and at the right hand end thereof is downwardly curved at 82 in more or less concentric relation with the lower wheel.

A door 83 hinged to the column 20, as at 84 (FIGURE 1), normally closes the space 69 in which the lower wheel rotates. Door 83 is inwardly flanged to enter inside of inwardly inturned portion 73 of side wall 50 (FIGURES 3 and 4) providing an opening 80 through which the downwardly moving cutting run of the blade passes from the blade guide opening 61. Wall section 71 is provided with an opening 85 which accommodates the forward end of the shaft of the motor mounted behind wall section 71.

Horizontally disposed mounting plate 48 is provided with a central forwardly projecting end portion 86 (FIGURE 4) of reduced width having a large diameter threaded opening 87 therein. At its rear end, this plate is provided with widely spaced small diameter threaded openings 88. Upon this plate, the supporting bracket member (not shown) for the work table is mounted for adjustment relative to the machine frame.

An upper saw blade guide unit assembly indicated at 97 is adjustably fixed to the lower end of a rectangular rod 92, the greater depth of section being parallel to the direction of cutting. The lower end of a saw blade guard member 93 is fixed on guide assembly 91 in parallel relation to the rod 92. The rod 92 is vertically adjustable in a supporting bracket (not shown) mounted within the upper pulley compartment.

The table 49 (FIGURE 1) is supported on plate 48 by means of trunnions (not shown) to conventionally permit rocking movement of the table about an axis located on the top surface of the table in a plane containing the cutting run of the saw blade 90. The trunions are conventionally provided with clamps to lock the table in any angularly adjusted position in a well known manner.

The table 49 is provided with a vertical opening closed by a slotted cap plate 94 closing the upper end thereof, through which the saw blade passes. A saw blade entrance slot 95 extending from the opening for plate 94 through the right hand edge of the table is conventionally provided with a tapered plug 96 adapted to be inserted to prevent springing of the separated parts of the table. The upper surface of the table is also provided with a rectangular groove 97 extending parallel to the cutting run of saw blade 90 to slidably receive a miter gauge or fence guide rail for the work. However, this table construction and the trunion mounting means for the table upon the trunion bracket are not specifically claimed herein, as it is in all essential respects fully disclosed and claimed in Tautz Patent 2,040,718 of May 12, 1936.

On the exterior of the right hand side wall 50 of the lower wheel and motor compartment assembly, immediately behind the dust spout 98, is a hand wheel 99 for adjusting the variable speed drive mounted within the lower motor compartment. Indicator 101 provides an indication of the speed which has been selected by adjustment of the hand wheel 99.

An auxiliary table support used for extremely heavy work is provided at 102 as shown in FIGURE 1. This support is a two piece structure comprising an upper shaft 103 pivotally pinned to the under side of table 49 and a cylindrical lower support member 104 telescopically receiving the free end of shaft 103 and slotted at its upper end between a pair of ears 105 provided to form a clamp lock for fixing shaft 103 in member 104 in a well known manner. Member 104 is pivoted to the corner of the lower wheel and motor compartment assembly near the bottom by a bracket and pin 106. As the table 49 is adjusted to different angular positions on its trunnions, shaft 103 telescopes within member 104 and the handle 107 permits locking shaft 103 in member 104 to provide an extremely rigid auxiliary table support for any adjusted position of the table.

As will be noted from reference to FIGURES 1 and 2 of the drawings, the inwardly turned edge portion 73 of the side wall 50 of the lower compartment assembly terminates at its upper end some distance below mounting plate 48 to form a corner opening 108 (FIGURES 2 and 3) to receive dust spout 98 which extends above plate 48 and is rigidly secured to cabinet wall 67 and the outer side flange of the channel member 48 by means of a bolt passing through bolt aperture 109.

By means of the frame structure above described the upper and lower wheel compartments are reinforced and made extremely rigid. By means of assembly 33 the column is reinforced and a rigid reenforcing core structure which effectively prevents any substantial deflection of the wheel compartment assemblies relative to one another which might otherwise take place due to the large stresses resulting from the high feed forces necessary to cut metal.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fabricated sheet metal support frame having a wheel enclosing cabinet for bandsaw, bandfiling, and like machine tools comprising a hollow, vertically elongated, sheet metal column and vertically aligned upper and lower wheel compartment assemblies connected thereto in vertically spaced relation to define a substantially C-shaped throat opening for said machine tool, a column reinforcing assembly comprising a post-like structure of tube steel of lesser length than said column, a pair of vertically spaced and aligned, radially protruding, steel support arms respectively cantilever supported at opposite ends of said post-like structure, and weld means securing said post-like structure adjacent its ends to peripherally related interior portions of said hollow column inwardly from the upper and lower column ends with said arms protruding through and extending substantially beyond one column side face in respective adjacent relation to said upper and lower wheel compartment assemblies; the upper and lower arms each being rigidly supportingly connected to said upper and lower compartment assemblies, respectively, at least at a point substantially removed from said column whereby said reinforcing assembly serves to provide a rigidifying cantilever support for said upper and lower wheel compartments to resist the static and dynamic stresses applied thereto.

2. The fabricated sheet metal support frame of claim 1 wherein the upper steel support arm comprises elongated, plate-like member having one end welded in straddling relation to the upper end of said post-like structure and an edge welded throughout its length to the upper wheel compartment whereby the weight and wheel rotational stresses of said upper wheel compartment are applied in a downward direction to the free laterally extending portion of said elongated, plate-like member.

3. The fabricated sheet metal support frame of claim 1 wherein the lower steel support arm comprises a channel member having one end of its web face welded in straddling relation to the lower end of said post-like structure and its main body extending at right angles to said post-like structure with one flange face welded throughout its length to the lower wheel compartment and a table support plate fixedly secured in superimposed relation to the free end of said channel member whereby the weight, wheel rotational stresses and the cutting forces of the moving band-like tool are applied in a downward direction to the free laterally extending portion of said channel member.

4. The fabricated sheet metal support frame of claim 1 wherein said post-like structure comprises a length of heavy gage, cylindrical tube steel and said weld means comprises a respective heavy gage steel mounting plate exceeding in length and width the diameter of said length of tube steel butt face welded in end closing relation to each end of said length of tube steel and along its edges to the inner wall faces of said hollow sheet metal column and wherein said laterally protruding, steel support arms are face welded throughout one end of a respective mounting plate in radially aligned relation.

5. The fabricated sheet metal support frame of claim 1 wherein the upper wheel compartment assembly includes an annularly ribbed reinforcing plate having the lower rib wall butt welded to a vertical face of said upper support arm and a vertical end face opposite the ribbed face welded to the inside face of the column back wall.

6. The fabricated sheet metal support frame of claim 1 wherein the lower wheel compartment assembly includes a support wall welded along its marginal face to a vertical face of said lower support arm and butt welded along one edge to a face wall of said hollow sheet metal column structure and a reinforcing channel bar welded along a vertical face to said support wall and welded along an end of its other vertical face to the inner face of the back wall of said hollow sheet metal column structure.

7. The fabricated sheet metal support frame of claim 1 wherein said weld means comprises mounting plates fixed to said post-like structure in end closing relation with their respective peripheral edges butt welded to the walls of said hollow, sheet metal column.

8. In a band saw type machine tool having a frame consisting of a hollow, vertical, polygonal, main support column of sheet metal and upper and lower wheel mounting assemblies rigidly connected to one side of said column to form a substantially C-shaped throat opening lying between said wheel mounting assemblies; a rigid, unitary, C-shaped, throat opening reinforcing assembly comprising a post-like tube extending within and substantially parallel to said column and having its ends rigidly connected to portions of the side walls of said main support column and an upper and a lower, vertically spaced and aligned, radially extending arm each rigidly connected at one end to said post-like tube and respectively connected to said upper and said lower wheel mounting assemblies at a substantial distance from said column to rigidify said frame for resisting heavy working forces applied to said wheel mounting assemblies during operation of said machine tool.

References Cited in the file of this patent

UNITED STATES PATENTS

| | | |
|---|---|---|
| 1,759,507 | Hawkinson | May 20, 1930 |
| 2,376,100 | Turrettini | May 15, 1945 |
| 2,604,126 | Wiken | July 22, 1952 |
| 2,621,552 | Montanus | Dec. 16, 1952 |
| 2,664,118 | Krumbach | Dec. 29, 1953 |
| 2,806,490 | Kennedy | Sept. 17, 1957 |

FOREIGN PATENTS

| | | |
|---|---|---|
| 129,259 | Australia | Sept 22, 1948 |